United States Patent [19]

Bonnet et al.

[11] 4,075,177

[45] Feb. 21, 1978

[54] THERMALLY HARDENABLE CATIONIC RESIN FROM DICARBOXYLIC ACID, DIALKANOLAMINE AND POLYAMINE COPOLYMER CONDENSED WITH EPICHLOROHYDRIN

[75] Inventors: Jean-Claude Bonnet, Blois; Gerard Tesson, Auzouer-en-Touraine, both of France

[73] Assignee: Manufacture de Produits Chimiques Protex, Paris, France

[21] Appl. No.: 648,037

[22] Filed: Jan. 12, 1976

[51] Int. Cl.² .......................................... C08G 63/46
[52] U.S. Cl. .................................. 260/75 T; 8/127.6; 8/194; 260/29.2 EP; 260/29.2 N; 260/29.2 E; 260/75 N; 260/75 EP
[58] Field of Search ............... 260/75 T, 75 N, 78 SC

[56] References Cited

U.S. PATENT DOCUMENTS

| 3,053,782 | 9/1962 | Shelby | 260/75 T |
| 3,869,427 | 3/1975 | Meschke et al. | 260/75 T |

*Primary Examiner*—Harold D. Anderson
*Attorney, Agent, or Firm*—Karl F. Ross

[57] ABSTRACT

A cationic resin which is thermally settable or thermally hardenable, for use in improving the moisture resistance of cellulosic fibrous materials such as paper, is produced by reacting at least one dicarboxylic acid with a mixture of at least one polyamine and at least one dialkanolamine to produce a polyamide-polyester copolymer soluble in water and subsequently condensed with epichlorohydrin.

4 Claims, No Drawings

THERMALLY HARDENABLE CATIONIC RESIN FROM DICARBOXYLIC ACID, DIALKANOLAMINE AND POLYAMINE COPOLYMER CONDENSED WITH EPICHLOROHYDRIN

FIELD OF THE INVENTION

The present invention relates to a process for producing a thermally settable cationic resin which is soluble in water and capable of being used to improve the moisture resistance of paper, or, more generally cellulosic fibrous material. The invention also relates to a water soluble synthetic-resin product capable of improving the moisture resistance of paper and to the product, namely, cellulosic fibrous materials with improved moisture resistance, as well as to a process for improving the moisture resistance of paper and other cellulosic fibrous materials. The invention also relates to improving shrinkage resistance of woolen materials.

BACKGROUND OF THE INVENTION

It has already been proposed to use amino resins, such as urea-formaldehyde anionic resins, for the treatment of paper in order to improve the resistance thereof to moisture, i.e. the ability of paper to withstand humid atmospheres. Anionic urea-formaldehyde resins are used in the presence of alum for incorporation in a paper past or slurry, in the production of unbleached paper and at an acid pH. The past is then applied to the usual supporting surface to form the paper web which is dried and subjected to heat to cure the resin.

It is also possible in a generally similar manner to use a cationic urea-formaldehyde resin at an acid pH for substantially all kinds of paper pastes or slurries. Among the latter type of resins is cationic melamine resins which are also used at an acid pH.

The disadvantage of operating with amino resins at acid pHs is that there always are difficulties with corrosion of the apparatus and, frequently, the formation of free formaldehyde which is a danger to personnel and an atmospheric pollutant. Thus the difficulties with amino resins operably only under acid conditions have limited their widespread successful application.

It was also known to use polyamine-epichlorohydrin and polyaminde-epichlorohydrin condensed resins in a neutral or alkaline medium generally at a pH between 6 and 9, to obtain a significant improvement in the resistance of paper to moisture without the drawbacks of the systems described earlier.

However, polyamide-epichlorohydrin resins and like condensates have been found to be disadvantageous on other grounds. For example, they must be stored in concentrations which are relatively weak (of the order of 10 to 20%) to avoid gelatin with time. Since the products have a relatively poor shelf life and cannot be stored adequately in high concentrations, their use is problematical. Furthermore, some of the products have been found to have a tendency to foam and thus must be used with great care.

OBJECTS OF THE INVENTION

The principal object of the present invention is to provide a process for the production of a synthetic-resin material which avoids the aforementioned disadvantages and is particularly satisfactory as an agent for improving the moisture resistance of cellulosic materials such as paper.

Another object of the invention is to provide an improved resin capable of imparting moisture resistance to cellulosic fibrous materials, such as paper, cardboard and nonwoven fabrics, have a long shelf life and capable of storage for prolonged periods at significant concentrations.

Yet another object of the invention is to provide an improved process for the production of paper with increased moisture resistance and cellulosic products having moisture resistance.

Another object is to improve the shrinkage resistance of woolen materials.

DESCRIPTION OF THE INVENTION

According to the invention, the drawbacks of earlier resin systems for improving the moisture resistance of cellulosic fibrous materials, such as paper, cardboard and nonwoven fabrics, are remedied by a process for providing a new resinous material which can be used in substantially any medium (acidic or nonacidic) produced by reacting at least one dicarboxylic acid (first component) with at least one polyamine (second component) and at least one dialkanolamine (third component) to obtain a copolymer of polyamide-polyester type soluble in water, and condensing with this latter polymeric material, epichlorohydrin. The result is a polyamide-polyester-epichlorohydrin condensed polymeric material which is thermally settable by heat, is soluble in water, has a long shelf life and can be stored for prolonged periods at relatively high concentrations without the difficulties encountered with earlier systems as described above.

Reference to "at least one" dicarboxylic acid is intended to mean that the reaction system can include one or more dicarboxylic acid, e.g. the first component can be a mixture of dicarboxylic acids, and it will equally be apparent that one or more polyamines (in the second component) and one or more dialkanolamines (in the third component) can be used in the reaction system according to the invention.

According to a feature of the invention, the polyamide-polyester copolymer is obtained by reacting a saturated or unsaturated aliphatic dicarboxylic acid having 3 to 10 carbon atoms with a mixture of polyalkylenic polyamine and dialkanolamine in molar proportions of the dicarboxylic acid/polyamine/dialkanolamine (first/second/third components) of the order of 0.8 to 1.1/0.3 to 0.9/0.1 to 0.7. Preferably the molar proportions are 0.9 to 1/0.5 to 0.7/0.3 to 0.5.

The copolymer-forming reaction is preferably carried out at a pH between 1 and 3 at a temperature between 120° and 200° C. (preferably 140° to 170° C.).

The reaction of the polyamide-polyester copolymer with epichlorohydrin is carried out with proportions such that 0.5 to 1.8 molecules of epichlorohydrin is present for active hydrogen atom of the copolymer, preferably so that 1 to 1.4 molecules of epichlorohydrin is available per atom of active hydrogen atom. This latter reaction is carried out at a temperature between 45° and 100° C., preferably between 50° and 90° C.

The product of the reaction, i.e. the thermally hardenable or thermally settable polyamide-polyester-epichlorohydrin condensate is soluble in water, and is a new composition, as made by the aforedescribed process, thus being an object of the present invention. The product can be stored for more than three months without gelatin and without introducing into the system a quaternization agent such as an alkyl halogenide, sulfate or phosphate. In other words stabilizing agents are not necessary for the storage of the produce.

Furthermore, the polyamide-polyester-epichlorohydrin resin can be used to improve the moisture resistance of cellulosic materials and can be introduced into the cellulosic materials by any conventional means, e.g. can be mixed with a cellulosic fiber paste or slurry or can be sprayed or other wise deposited upon layer of the cellulosic paste or slurry. It can be stored at concentrations of the order of 40 to 50% and has been found to have little foaming tendency.

The composition of the present invention is used in the form of an aqueous solution and is miscible with water in all proportions. It is thermally settable and cationic and hence highly effective for use with cellulosic fibers. As noted, it may be incorporated in any manner in paper or paper-forming materials although it is preferred to incorporate it into the past or suspension in an aqueous system before forming the paper web. The composition of the present invention can be used at acid, neutral or alkaline pH, with best results being obtained at a pH between 5 and 9 exclusive.

Paper treated with a resin according to the invention has not only excellent resistance to moisture, but good flexibility and improved absorptive capacity.

According to the invention the dicarboxylic acid is preferably a saturated carboxylic acid having 3 to 10 carbon atoms and can be selected from the group which consists of succinic, adipic, azelaic, or sebacic acid. The dicarboxylic acid can be an unsaturated dicarboxylic acid having 3 to 10 carbon atoms and preferably is an acid selected from the group which consists of maleic acid, itaconic acid or fumaric acid.

The diacids may be used individually or in any combination.

Of the polyamines which can be used in accordance with the present invention, we have found the most satisfactory to be polyethylenic polyamines, polypropylenic polyamines and polybutylenic polyamines for economical reasons.

Up to about 30% of the polyalkylene polyamine can be replaced by a diamine of the ethylene diamine or hexamethylene diamine type. In other words the proportion of polyamine given above from 0 to 30% in molar terms may be ethylene diamine or hexamethylene diamine.

The dialkanolamine may have 4 to 15 carbon atoms according to the invention but preferably diethanolamine is used as the dialkanolamine compound.

When the reaction is carried out as described above, the ultimate condensate will have proportions of the dicarboxylic acid/polyamine/dialkanolamine of the order of 0.8 to 1.1/0.3 to 0.9/0.1 to 0.7 and preferably molar proportions of 0.9 to 1/0.5 to 0.7/0.3 to 0.5.

The copolymers of the invention are, considered statistically, an alternation of amide groups obtained by condensation of primary amine groups of polyamine with the acid groups of diacids, and ester linkages obtained by condensation of the hydroxyl groups of the dialkanolamines with the acid groups of the diacids.

To obtain copolymers of a conventional molecular weight we prefer to use a quantity of diacid sufficient to react with all of the primary amine groups and all of the hydroxyl groups of the polyamine-polyalkanolamine mixture.

The molar ratio of the dibasic acid to the polyamine-polyalkanolamine mixture is preferably between 0.8:1 to 1.1:1, preferably between 0.9:1 to 1:1.

As noted, the polycondensation is carried out in an acid medium at a pH between 1 and 3 so as to particularly favor the esterification reaction. The pH is controlled by the addition of strong mineral acid such as sulfuric acid or phosphoric acid.

The reaction temperature may vary within the range of 120° to 200° C. although preferably the temperature is held between 140° and 170° C., all ranges being inclusive. The reaction can be carried out at atmospheric pressure or subatmospheric pressure, the use of subatmospheric pressures permitting the use of somewhat lower temperatures.

The duration of the reaction is a function of the condensation temperature and pressure and generally ranges between 30 minutes and 2 hours. Most commonly the reaction time is between 1 hour at 1.5 hours and atmospheric pressure operating at a temperature between 160° and 180° C.

The copolymer formed in the initial stage of the reaction is thereafter transformed into a cationic resin having thermal setting characteristics by reacting the copolymer with epichlorohydrin at the primary and secondary amine groups of the copolymer. This second stage reaction is carried out at a temperature between 45° and 100° C., preferbly between 50° and 90° C. until the reaction mixture attains a desirable viscosity, preferably 100 to 1000 cps measured by a ROTOVISKO HAAKE (UM=1) viscosimeter.

The reaction is carried out in an aqueous medium which can be more or less diluted to maintain a viscosity which is not permitted to increase too rapidly. The duration of the second stage reaction is a function of concentration of the reaction compounds and the temperature although it is also dependent upon the pH. It is preferred to operate with a pH between 6 and 7.

The quantity of epichlorohydrin which is used is preferably at least sufficient to convert all of the primary and secondary amine groups into tertiary amine groups. Investigation has shown that this amount corresponds to 0.5 to 1.8 molecules of epichlorohydrin per atom of active hydrogen.

When the reaction has been carried out to yield the desired viscosity, the reaction mixture can be treated to adjust the pH to 4.5 to 5 with substantially any convenient acid, for example hydrochloric acid, sulfuric acid, acetic acid in order to provide a stable product. It has been found to be most advantageous to use hydrochloric acid.

As noted eariler, the principal use of the resin according to the invention is in the improvement of the moisture resistance of paper and hence in the fabrication of absorptive paper webs, e.g. linen paper (rag paper). It has been found to be of particular importance in the production of photographic paper, filter paper and wrapping paper. The resin is incorporated in the paper in amounts of 0.1 to 5% by weight of the dry weight of the paper.

Although the improvement of the moisture resistance of paper is its primary utility, because of its cationic and thermosetting characteristic the composition of the present invention can be used as an adhesive to cellulosic fiber supports and mineral supports. It may also be used in the production of nonwoven cellulosic fabrics which can be impregnated with the solution of the composition or which can be sprayed with the solution of the composition. It is most advantageous to apply the solution by steeping or soaking at cellulosic fibers therein. The use of the composition in this system has been found to promote agglomeration of cellulosic or synthetic-resin fibers.

It has also been found that the composition is a highly effective primary coagulant or additive to promote flocculation especially in the treatment of residual waters. It can be used as an antishrinkage and antifelting agent for wool fibers.

SPECIFIC EXAMPLES

A 1 liter reactor equipped with an agitator, a distillation system and a thermometer serves as the reactor for carrying out the present invention. 123.6 grams (1.2 mole) of diethylene triamine, 100 grams of water, 84 grams (0.8 mole) of diethanolamine and 5 grams of 75% phosphoric acid are introduced into the reactor.

292 grams (2 moles) of adipic acid is slowly added with agitation. After the acid has dissolved the reaction mixture is raised to a temperature of 160° to 170° C. and water is distilled off. After one hour at atmospheric pressure at this temperature, the reactor is evacuated for 30 minutes.

The reaction mixture is then cooled to 120° to 130° C. and 200 grams of water is added. The yellowish resin has 70.5% solids and has a color on the G scale of 8-9. The acid index of the product is 46 and its viscosity as measured on a Haake viscometer model UM=1 is 1150 cps.

200 grams of this resin are introduced into a 1 liter flask with 100 grams of water and the pH is adjusted to 6.9 with 10 milliliters of 30% phosphoric acid solution. 36 grams of epichlorohydrin are added with heating to 80°-90° C., until the viscosity as measured on a Haake viscometer model UM=1 is 300 cps. After cooling, the pH is adjusted to 4.5 with 5 milliliters of 10 hydrochloric acid. The obtained resin (A) has a solid content of 53% and a color (Gardner scale) G=6.7. It can be safely stored for more than six months.

EXAMPLE II

A polyamide-polyester copolymer is prepared as described in Example I from a reaction mixture containing 155 grams (1.5 moles) of diethylenetriamine, 52.5 grams (0.5 moles) of diethanolamine diluted in 100 grams of water, with 277.5 grams (1.9 mole) of adipic acid in the presence of 5 grams of 75% phosphoric acid.

The temperature is raised to 170° C and maintained for 1 hour at this temperature before being evacuated for another 30 minutes. The reaction mixture is cooled to 120°-130° C and 450 grams of water are added slowly so as to obtain a clear yellow polyamide-polyester copolymer solution with a color (Gardner scale) G = 4.5 containing 54.5 % dry materials and having a viscosity as measured an a Haake viscometer model UM=1 of 200 cps. The product has an acidity index of 11.2.

200 grams of the latter resin is introduced into a 1-liter flask with 100 grams of water.

The pH is adjusted to 6.8 with a 30% phosphoric acid solution.

40 grams of epichlorohydrin are added slowly with heating to 80-90° C until the viscosity as measured on a Haake viscometer model UM=1 is 150 cps. 200 grams of water are then added and the pH is adjusted to 4.5 with 7 milliliters of 10% hydrochloric acid. The resin obtained (B) has 24.7% dry matter, a color (Gardner scale) G = 3.4 and a BROOKFIELD (UM = 1) viscosity of 50 cps. The product can be stored for more than six months without difficulty.

EXAMPLE III

Following the method of Example I, a polyamide-polyester copolymer is produced by reacting 219 grams of triethylenetriamine (1.5 mole) and 52.5 grams (0.5 mole) of diethanolamine in 100 grams of water, with 262.8 grams (1.8 mole) of adipic acid in the presence of 5 grams of 75% phosphoric acid under a nitrogen atmosphere.

The temperature is raised to 160° C and is maintained for an hour at this temperature, whereupon the reaction mixture is subjected to vacuum for 30 minutes.

The reaction mixture is cooled to 120°-130° C and 380 grams of water is added so as to yield a yellowish polyamide-polyester copolymer solution (color G = 8.9) containing 58.9% dry matter and having a viscosity as measured on a Haake viscometer model UM=1 of 240 cps. The acidity index is 1.2.

200 grams of this resin and 200 grams of water are introduced into a 1-liter flask and the pH is adjusted to 7 with 16 milliliters of 10% hydrochloric acid. 45 grams of epichlorohydrin is added and the contents of the flask are heated with refluxing until the viscosity as measured on a Haake viscometer model UM=1 is 180 cps. 300 grams of water are added and the pH is adjusted to 4.5 with 5 milliliters of 10% hydrochloric acid.

The resulting resin (C) contains 20.7% dry solids, has a viscosity as measured on a Haake viscometer model UM=1 of 30 cps and a color (Gardner scale) of G = 5 - 6. It has a storage stability of more than six months.

EXAMPLE IV

Using the method of Example I a mixture of 82.4 grams (0.8 mole) of diethylemetriamine, 29.2 grams (0.2 mole) of triethyhlenetetramine and 105 grams (1 mole) of diethanolamine are reacted with a mixture of 175.2 grams (1.2 mole) of adipic acid and 150.4 grams (0.8 mole) of azelaic acid in 100 grams of water in the presence of 5 grams of 75% phosphoric acid under a nitrogen atmosphere. The temperature is raised to 160°-170° C and held at this temperature for one hour. The last traces of water are eliminated and the reaction mixture is maintained under vacuum for 30 minutes.

The reaction mixture is cooled to 120° C and 200 grams of water are added to produce an aqueous solution of 72.5% dry matter of the polyamide-polyester copolymer having a viscosity as measured on Haake viscometer model UM=1 of 2100 cps and a color (Gardner scale) G = 6 - 7. The resin has an acidity index of 36.

200 grams of this resin and 100 grams of water are introduced into a 1-liter flask and the pH is adjusted to 6.9 with 18 milliliters of hydrochloric acid as described in the previous Example, whereupon 38 grams of epichlorohydrin is added. The reaction mixture is refluxed until the viscosity as measured on a Haake viscometer model UM=1 is 200 cps.

The pH is adjusted to 4.5 with 7 milliliters of hydrochloric acid as described in Example III. The obtained resin (D) contains 51.2% dry material and has a color value (Gardner scale) of G = 5 - 6. The storage life is more than six months.

EXAMPLE V

The resistance to moisture is measured dynamometrically by measuring the dry and wet length at break according to French standard NF Q 03.004 and the bursting strength is obtained by measuring the bursting indices dry and wet according to French standard NF Q 03.014.

The improvement in moisture resistance is expressed in the case of dynamometric measurements by the formula $$R_1 = \frac{\text{length at rupture (wet)}}{\text{length of rupture (dry)}} \times 100$$

The bursting strength improvement is given by the formula $$R_2 = \frac{\text{bursting strength index (moist)}}{\text{bursting strength index (dry)}} \times 100 .$$

Each of the resins A – D is utilized in an amount of 1% dry weight of the dry components of a paper paste for cellulosic bleached Kraft paper, the paper being fabricated into the usual webs in each case. Tests were taken at three different pH values of the paste for each resin, with the following results:

| Resin | pH | Dynamometric | Bursting |
|---|---|---|---|
| (A) | 5 | 47% | 44% |
|     | 7 | 44% | 42% |
|     | 9 | 41% | 42% |
| (B) | 5 | 49% | 45% |
|     | 7 | 42% | 55% |
|     | 9 | 47% | 47% |
| (C) | 5 | 49% | 52% |
|     | 7 | 48% | 50% |
|     | 9 | 46% | 50% |
| (D) | 5 | 34% | 40% |
|     | 7 | 38% | 39% |
|     | 9 | 39% | 42% |

All the resins show marked improvement in wet breaking strength, even at basic pH values.

EXAMPLE VI

Specimens (ribbons) of combed wool are chlorinated for 2 hours at 80° C under vacuum by gaseous chlorine. After neutralization and rinsing, the ribbons are treated in an aqueous bath containing 0.4% by weight of the resin A, 0.08% by weight of a secondary polyethylene emulsion and 0.05% by weight of a nonionic emulsifying agent at a pH of 5. The ribbon, after treatment, is made into fabric having excellent shrink resistance.

We claim:

1. A process for producing a cationic thermally settable water soluble resin comprising the steps of:
    a. reacting in an acid aqueous medium a first component consisting of at least one aliphatic dicarboxylic acid with a mixture of a second component consisting of at least one polyamine and a third component consisting of at least one dialkanolamine to produce a polyamide-polyester copolymer soluble in water, where the molar ratio of said first component to said second component to said third component is substantially 0.8 to 1.1/0.3 to 0.9/0.1 to 0.7; and
    b. condensing said polyamide-polyester copolymer with epichlorohydrin, said polyamide-polyester copolymer reacted with the epichlorohydrin in a proportion corresponding to 0.5 to 1.0 molecules of epichlorohydrin per atom of active hydrogen of the copolymer.

2. The process defined in claim 1 wherein said aliphatic dicarboxylic acid is a saturated or unsaturated dicarboxylic acid containing 3 to 10 carbon atoms, and said polyamine is a polyalkylene polyamine, the reaction being carried out at a pH between 1 and 3 and a temperature between 120° and 200° C, said polyamide-polyester copolymer being reacted with the epichlorohydrin at a temperature between 45° and 120° C.

3. The process defined in claim 2 wherein said molar ratio of said first component/second component/third component is 0.9 to 1/0.5 to 0.7/0.3 to 0.5, the reaction of said component is carried out at a temperature between 140° and 170° C, the copolymer and the epichlorohydrin being reacted in a proportion corresponding to 1 to 1.4 molecules of epichlorohydrin per atom of active hydrogen of the copolymer at a temperature between 50° and 90° C.

4. A cationic thermally hardenable water soluble resin made by the process defined in claim 1.

* * * * *